United States Patent [19]

Malizia et al.

[11] 4,031,255
[45] June 21, 1977

[54] FIXING ACETALDEHYDE IN SUCROSE

[75] Inventors: Peter Donato Malizia, Port Chester, N.Y.; William Alexander Mitchell, Lincoln Park, N.J.

[73] Assignee: General Foods Corporation, White Plains, N.Y.

[22] Filed: July 3, 1975

[21] Appl. No.: 593,145

[52] U.S. Cl. .............................. 426/534; 426/650
[51] Int. Cl.² ........................................ A23L 1/226
[58] Field of Search ........................... 426/534, 650

[56] References Cited

UNITED STATES PATENTS 3,843,822  10/1974  Mitchell ........................... 426/650
3,898,347  8/1975   Mitchell ........................... 426/534

*Primary Examiner*—Joseph M. Golian
*Attorney, Agent, or Firm*—Thaddius J. Carvis; Bruno P. Struzzi; Daniel J. Donovan

[57] ABSTRACT

An improved method for fixing volatile flavoring compounds such as acetaldehyde is disclosed. The method comprises: obtaining a glassy, aqueous, supersaturated sucrose solution; mixing therewith a volatile flavoring compound sufficiently to at least partially dissolve the volatile flavoring compound in the solution and initiate crystallization of the sucrose; contacting the resulting mixture with a stream of a drying gas during the mixing operation to at least partially dry the mixture as crystallization proceeds; and recovering as a product crystalline sucrose having the volatile flavoring compound fixed therein.

10 Claims, No Drawings

FIXING ACETALDEHYDE IN SUCROSE

BACKGROUND OF THE INVENTION

This invention relates to food flavoring compositions. More particularly, it relates to an improved method for fixing volatile flavoring compounds such as acetaldehyde in stable form.

It has been known for some time that compounds such as acetaldehyde are important flavor components of natural fruits and vegetables and serve as flavor enhancers for various notes naturally present in food products of this type. Acetaldehyde in particular is important for its ability to increase the impact and apparent freshness of certain flavors. However, while the presence of acetaldehyde is a valuable enhancer in a number of food products, it has been difficult until recent years to incorporate it into a stable, solid flavor composition.

The art of fixing these volatile flavoring compounds has been advanced by the procedures outlined in several recent U.S. Patents. U.S. Pat. No. 3,314,803, to Dame, discloses a method of fixing acetaldehyde by encapsulating it in a matrix of mannitol. This procedure produces a dry, nonhydroscopic material which retains a portion of its fixed acetaldehyde even under non-hermetic conditions. Unfortunately, this procedure is very costly because of the high price of mannitol, which is usually not necessary as an ingredient in food compositions except for its use as a flavor fixative. Moreover, while an initial fixation of from about 2% to about 10% of acetaldehyde can be obtained, the initial fix will be modulated in several days and the level of acetaldehyde will equillibrate to a lower, stable range, usually between about 1% and about 3%. Thus, additional costs due to the loss of acetaldehyde are experienced.

In U.S. Pat. No. 3,787,592, to W. A. Mitchell, et al., there is disclosed a method of fixing volatile flavoring compounds such as acetaldehyde in crystalline materials such as sucrose. By this procedure, the volatile flavoring compound is trapped within the lattice of the crystalline material at low levels. While the degree of fix is low on a weight basis, it provides economies because these crystalline materials are themselves constituents in many of the food products utilizing the flavoring compounds. Moreover, the acetaldehyde is tenaciously held.

In another recent U.S. Pat. No. 3,767,430 to E. L. Earle, et al., a process is described for producing sucrose-fixed acetaledhyde at potentially commercial scale. According to this procedure, acetaldehyde is added to a supersaturated sucrose solution during crystallization to obtain a slurry wherein the acetaldehyde is fixed within the surcrose crystals. By adding a suitable quantity of crystalline sucrose to the slurry, the percentage moisture level of the slurry is reduced to levels more conducive to further handling. Here again, the level of fixation of the acetaldehyde is low but economies are achieved for the reasons mentioned with regard to the Mitchell et al process discussed above.

Another recently issued patent, U.S. Pat. No. 3,843,822 to W. A. Mitchell, provides yet another procedure for tenaciously fixing acetaldehyde within a sucrose matrix. According to the procedure of this patent, the acetaldehyde is provided by utilizing paraldehyde as the source of acetaldehyde. The paraldehyde is mixed with a supersaturated sucrose solution and converted to acetaldehyde during processing.

While these recent developments provide long awaited solutions to the problem of fixing volatile flavoring compounds in solid materials, there remains a present need for enabling commercial production of these materials at even greater cost savings.

SUMMARY OF THE INVENTION

Accordingly, it is an object of the present invention to provide an improved method for fixing volatile flavoring compounds, such as acetaldehyde, into crystalline sucrose.

It is another object of the present invention to provide a method for producing dry, crystalline, fixed volatile flavoring compounds at reduced processing costs.

These and other objects are accomplished by the present invention which provides a method for producing a solid flavoring composition containing low levels of a volatile flavoring compound comprising the steps of: providing a supersaturated, glassy, aqueous sucrose solution; mixing therewith a volatile flavoring compound sufficiently to dissolve the volatile flavoring compound in the sucrose solution and to initiate crystallization of the sucrose; contacting the resulting mixture with a stream of a drying gas while continuing crystallization of the sucrose to partially dehydrate the solution during crystallization; and recovering crystalline sucrose containing low levels of the volatile flavoring compound fixed therein.

DETAILED DESCRIPTION

The present invention is based upon the discovery of a new process which enables the rapid, efficient and economical production of sucrose fixed volatile flavors such as acetaldehyde having a high degree of uniformity.

As disclosed, in U.S. Patent application Ser. No. 404,528 to W. A. Mitchell, filed Oct. 9, 1973, now U.S. Pat. No. 3,898,347, the use of a high sucrose content, supersaturated aqueous sucrose solution simplifies product recovery in the production of sucrose fixed acetaldehyde. It is disclosed in that application that a sucrose content of from about 88% to about 93%, based upon the combined weight of sucrose and water in the sucrose solution, is necessary to obtain the objectives of that invention. Similarly, these ranges can be employed according to the present invention. Lower sucrose contents (e.g., of about 80%) can, however, also be employed according to this invention due to the realization that the dilution of the solution due to separation of the sucrose during crystallization can be remedied by dehydrating the solution as crystallization proceeds without adversely affecting the level of acetaldehyde fixed in the product.

In order to provide the supersaturated, glassy, aqueous sucrose solution having the desired sucrose concentration, it is possible to heat either crystalline sucrose and water or a commercial unsaturated sucrose solution to a temperature effective to yield the proper sucrose content. Temperatures of from about 110° C to about 125° C are preferred. One method for preparing the sucrose solution is to charge water and crystalline sucrose in the desired proportions into a screw fed extruder having a heated barrel. The extruder will dissolve the crystalline sucrose as it heats and constantly mixes the two materials. Typical of the devices which can be employed are a Baker-Perkins M-P multi-purpose continuous mixer and a Readco continuous processor. Passage of the materials through such an extruder will provide a molten, saturated sucrose solution which can then be cooled to the glassy, supersaturated state.

To supercool the molten sucrose solution, it is desirably contacted with a medium capable of effecting rapid cooling without allowing significant crystallization. Preferably the molten sucrose is immersed into a liquid or contacted with a cold surface to rapidly bring the temperature to below about 20° C. According to one embodiment, the molten sucrose is contacted with dry ice, either directly or through a thin metal foil, to obtain rapid cooling. Alternatively, the molten sucrose can be immersed into a liquid cooling medium such as liquid nitrogen, liquid Freon, liquid acetaldehyde, liquid alcohol, or the like. According to this embodiment, the molten sucrose can be extruded directly into the liquid. A die having at least one 1/32 inch to ½ inch diameter orifice is preferably employed. By cooling in the liquid, discrete beads of glassy sucrose are obtained, especially where the liquid is maintained at temperatures below about −20° C. Where the material is cooled by contacting it with a surface cooled to a temperature below about −20° C, discrete beads are not normally formed but the material is easily fractured to form discrete particles. The fracturing can be accomplished by employing the simplest means, such as a hammer, or any of the more sophisticated devices which are known to the art as being suitable for particulating the material under reduced temperatures.

While preparation of the sugar glass by rapidly freezing to a temperature of below about 20° C is the preferred manner of preparing the sugar glass according to the present invention, it is noted that the glass can be prepared in known manner, for example, as discussed in the earlier application of W. A. Mitchell, Ser. No. 404,528, now U.S. Pat. No. 3,898,347.

Whatever means is employed for obtaining the sucrose glass, it is charged into a mixing device capable of providing intimate mixing of this cold glass with the volatile flavoring compound. Typical of the devices which can be employed are paddle mixers and wire whisk mixers.

The sucrose glass and the volatile flavoring material are intimately mixed and blended for an initial period of time sufficient to initiate crystallization of the sucrose. If desired, a small quantity of crystalline sucrose can be added to the mixing device as seed for crystallization. Stirring is continued until the mixture takes on a semi dry, opaque appearance. At this point the concentration of the sucrose solution has been reduced considerably due to the precipitation of sucrose from the solution. By passing a stream of a drying gas over the mixture as it is being mixed, the moisture content of the remaining mother liquor is continuously reduced and, advantageously, the temperature of the mixture is likewise controlled to low levels due to the cooling effect produced by the evaporation of the water. By continuing mixing with the aid of the drying gas, complete crystallization of the sucrose can be achieved to produce a product having a moisture content of preferably below about 7%, and more preferably below about 2%.

The temperature of the sucrose mixture during mixing should be maintained below about 30° C, and preferably below about 20° C. In this connection, it is preferable to employ a mixer which produces a minimum amount of heat during mixing. Typical of the devices which can be employed are a simple paddle mixer, for example such as a Hobart or a Ross Planetary mixer; alternatively, a whisk or other like mixer can be employed. Optionally, these mixers can be cooled such as by a water jacket or any other suitable cooling means. Because the acetaldehyde is oxidized to acetic acid in the presence of water, oxygen and light, an inert gas such as carbon dioxide, nitrogen or the like is preferably employed as the drying gas; however, where water contents are kept low, air can be used and is preferred for economy. The drying gas is preferably employed at a temperature from about 20° C to about 30° C at a relative humidity below about 50%, more preferably at a relative humidity of less than about 40%. The total mixing time will typically extend from about 10 to about 120 minutes. Any volatile flavoring material which is released in solution during the mixing is desirably collected, condensed and recycled.

The resulting crystalline mass will contain no appreciable amounts of mother liquor which need to be moved before final drying. If desired, the product can be dried by starting at a low temperature, typically about equal to that of the mass upon termination of crystallization, for a period before drying at elevated temperatures. However, it is possible to immediately subject the crystals to air or other drying gas at slightly elevated temperatures, in the order of from about 25° C to about 40° C, with only minimal loss of volatile flavoring compound due to redissolution of the crystals.

The redissolution, and loss of volatile flavoring compound during final drying can be mitigated by employing relatively large volumes of rapidly moving, low relative humidity air. In this manner, elevated temperatures can be employed without raising the temperature of the mass because the vaporization of the water effects a constant removal of heat. The temperature is optimally, progressively increased during drying at such a rate that the remaining liquor always remains supersaturated. Those skilled in the art will be aware of the appropriate temperatures, humidities and flow rates. Obviously, the temperature differential between the product mass and the drying air can be raised as the degree of moisture is reduced. The final drying temperature can be within the range of from about 50° C to about 130° C, preferably from about 60° C to about 90° C. Other suitable drying conditions and means, such as vacuum ovens and the like, can be employed.

The improved process of the present invention can be employed to tenaciously fix volatile flavoring compounds within the individual crystals of sucrose at levels of about 0.5% based on the weight of the sucrose. In the case of acetaldehyde, where an excess is added to the sucrose glass, it is generally fixed at levels of above about 0.05%. When employed in dry beverage or dessert mixes, it is usually desirable to use crystalline sucrose prepared according to the present invention which contains the volatile flavoring compound fixed therein at higher levels within this range. However, for other applications such as acetaldehyde containing sugar for sprinkling on and enhancing the flavor of foodstuffs such as fruits, relatively low amounts, e.g. on the order of from about 0.001% to about 0.05% of acetaldehyde may be desirable.

The following examples are presented for the purpose of further illustrating and explaining the present invention and are not to be taken as limiting in any sense. Unless otherwise specified, all parts and percentages are by weight.

EXAMPLE I

To 350 grams of sugar is added 100 ml of water and this is gently heated until all crystalline sucrose is dissolved. This mixture is then heated to a temperature of about 117° C and transferred to the bowl of a Hobart mixer. This mass is then supercooled to about 19° C. A whisk stirrer is used at low speed to mix the supercooled solution while 50 ml of acetaldehyde and about 1 gram of sucrose seed crystals are added. After about 7 minutes of mixing, the mass takes on a semi-dry appearance. At this point dry air is blown into the mixer, the stirring rate is increased, and the mixing is continued for about 7 additional minutes to obtain a product considered dry at a moisture content of about 5%. The remainder of the moisture and any paraldehyde which may be present are removed by heating the crystalline material at about 70° C for about ½ hour. The product is then ground and is ready for use as a flavor enhancer. On analysis the product is found to contain 0.49% acetaldehyde.

EXAMPLE II

To 350 grams of sugar is added about 100 ml of water. This mixture is heated to about 120° C and poured onto an aluminum foil positioned on a block of dry ice. The layer of sugar glass is thin and promotes rapid cooling. After a few minutes, the brittle glass is easily broken and particulated by cracking with a hammer. This particulated sugar glass is added slowly to the bowl of a Hobart mixer along with a little sucrose seed and 50 mls. of acetaldehyde also added slowly. The slow feeding enables good mixing of the materials and enables complete crystallization within about 15 minutes. Toward the end of the mixing, the mixture takes on an opaque, semi-dry appearance and air is blown into the mixer. A mass of semi-dry, course particles is produced which can be dried directly for ½ hour at 70° C or first ground to a powder and then dried. On analysis, the product is found to contain 0.23% acetaldehyde.

The above examples and explanation are set forth for the purpose of teaching those skilled in the art how to practice the invention. Upon reading this disclosure, those skilled in the art will become aware of a number of modifications and variations. It is contemplated that these modifications and variations be included within the scope of the present invention which is defined by the following claims.

What is claimed is:
1. An improved method for fixing acetaldehyde in sucrose which comprises:
 a. obtaining, at a temperature of below about 20° C, a glassy, aqueous, supersaturated sucrose solution containing from about 80 to 93% sucrose, based on the combined weight of sucrose and water;
 b. mixing acetaldehyde with said glassy, aqueous supersaturated sucrose solution sufficiently to at least partially dissolve the acetaldehyde therein and initiate crystallization of the sucrose;
 c. contacting the resulting mixture with a stream of drying gas during the mixing operation to at least partially dry the mixture as crystallization proceeds; and
 d. recovering, as a product, crystalline sucrose having acetaldehyde fixed therein.
2. A method according to claim 1 wherein the drying gas is air at a temperature of from about 20° C to about 30° C and a relative humidity below about 50%.
3. A method according to claim 1 wherein the mixing and the contacting of the mixture with the drying gas are continued until the moisture content of the mixture is reduced to below about 7%.
4. A method according to claim 1 wherein the glassy, aqueous, supersaturated sucrose solution is prepared by contacting a saturated sucrose solution with a medium capable of effecting rapid cooling without allowing significant crystallization.
5. A method according to claim 4 wherein the saturated sucrose solution is immersed in a liquid maintained at a temperature below about −20° C.
6. A method according to claim 4 wherein the saturated sucrose solution is contacted with a surface maintained at a temperature below about −20° C.
7. A method according to claim 4 wherein the glassy, aqueous, supersaturated sucrose solution is mixed in particulate form with the acetaldehyde.
8. A method according to claim 7 wherein the drying gas is air at a temperature of from about 20° C to about 30° C and a relative humidity below about 50%.
9. A method according to claim 8 wherein the mixing and contacting of the mixture with drying gas are continued until the moisture content of the mixture is reduced to below about 7%.
10. A method according to claim 9 wherein the acetaldehyde is fixed at a level of from about 0.05% to about 0.5%.

* * * * *